E. STANLEY.
SLED ATTACHMENT FOR AUTOMOBILES.
APPLICATION FILED OCT. 14, 1916.
1,229,161.
Patented June 5, 1917.
2 SHEETS—SHEET 2.
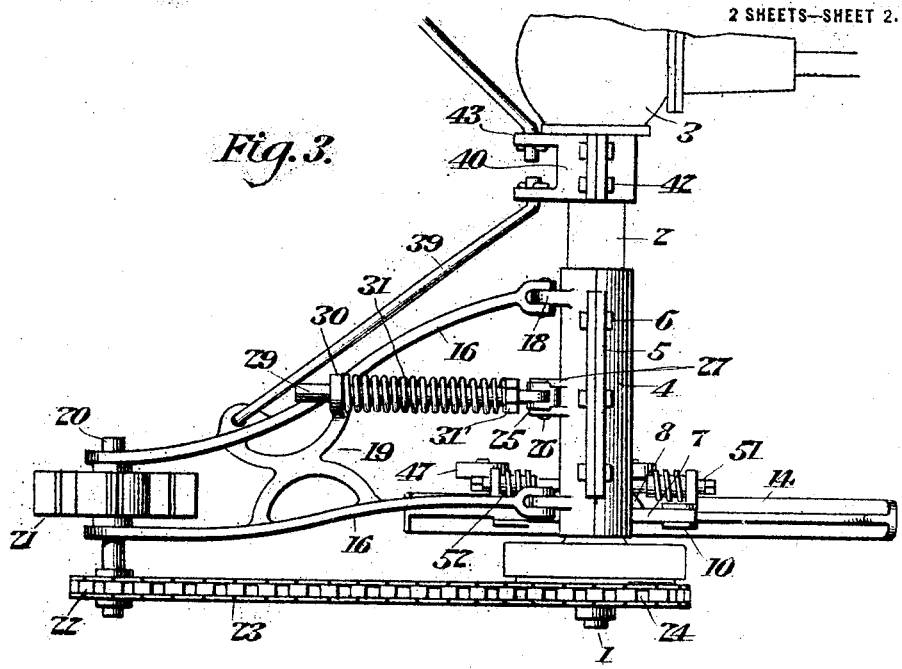
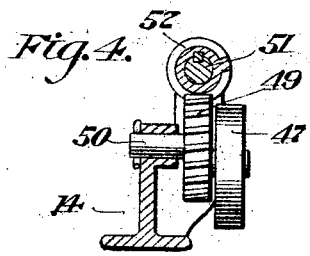
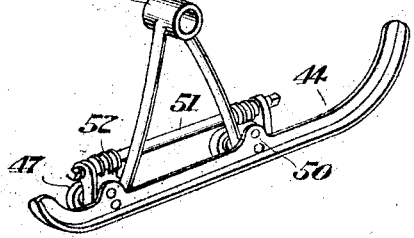
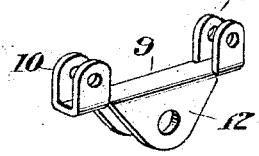
Witnesses,
Inventor
Ed. Stanley
By Victor J. Evans
Attorney

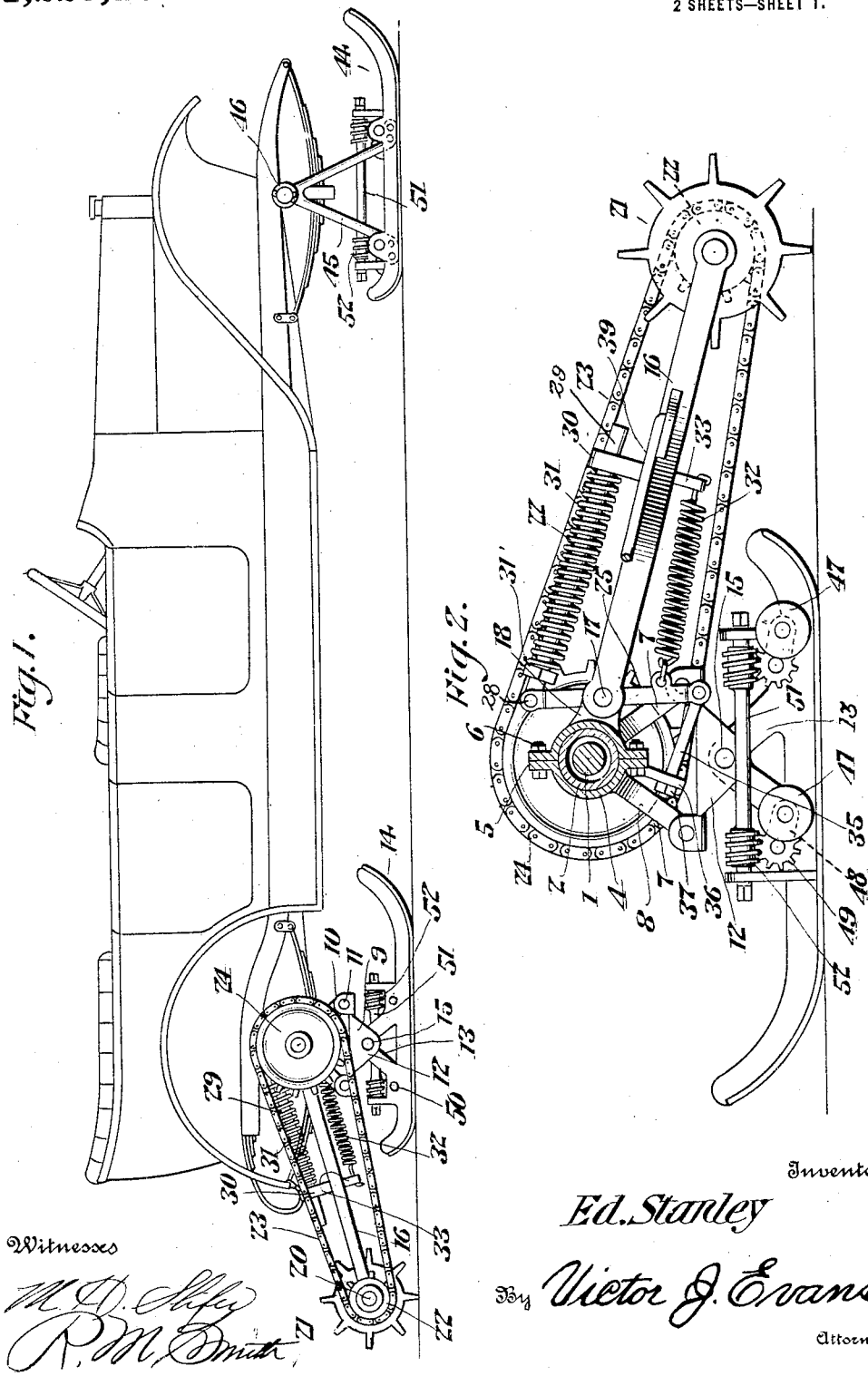

UNITED STATES PATENT OFFICE.

ED STANLEY, OF HART, MICHIGAN.

SLED ATTACHMENT FOR AUTOMOBILES.

1,229,161. Specification of Letters Patent. Patented June 5, 1917.

Application filed October 14, 1916. Serial No. 125,619.

*To all whom it may concern:*

Be it known that I, ED STANLEY, a citizen of the United States, residing at Hart, in the county of Oceana and State of Michigan, have invented new and useful Improvements in Sled Attachments for Automobiles, of which the following is a specification.

This invention relates to sled attachments for automobiles the broad object in view being to provide runners and means associated therewith applicable to automobiles after removing the front and rear steering and driving wheels thereof, whereby the body and chassis are supported upon runners and combined with propelling or driving means adapted to engage a road surface covered with ice, snow or the like.

One of the chief aims of the present invention is to provide in connection with the runners and driving means, other means whereby the driving mechanism may be relaxed and the runners elevated and rollers or wheels used in lieu thereof when the machine is driven into and out of a garage or upon road surfaces which are bare or from which the snow has been removed.

With the above and other objects in view, the invention consists in the novel construction, combination and arrangement of parts herein fully described, illustrated and claimed.

In the accompanying drawings:—

Figure 1 is a side elevation showing the sled attachment applied to an automobile the wheels of which have been removed, Fig. 2 is a side view on an enlarged scale of one of the runner attachments applied to the rear axle housing, the latter being shown in section, Fig. 3 is a fragmentary view showing one of the runners and the parts connected therewith, Fig. 4 is a fragmentary cross section illustrating the runner-lifting means, Fig. 5 is a perspective view of one of the front runners, Fig. 6 is a detailed perspective view of the yoke of one of the rear runners.

Referring to the drawings 1 designates the rear driving axle which is of the usual construction at present in use in automobiles, the same being divided and the sections thereof being mounted in the rear axle housing 2 and being connected with each other by the usual differential gearing located within the central housing 3, said parts being of the usual construction and arrangement.

In carrying out the present invention, in connection with the rear axle housing, I employ a pair of clamping sleeves 4 each of which is made in two parts divided along the diametrical line of the housing 2 and formed with flanges 5 at their meeting faces through which are inserted clamping bolts 6, the sections of the clamp 4 being of such size that when the bolts 6 are tightened, the clamp as a whole is held in fixed relation to the adjacent end of the rear axle housing 2.

Extending downwardly from the outer end of each clamp 4 are downwardly-diverging legs 7 which are strengthened by means of angle braces 8 extending from said legs to the sections of the clamp 4 adjacent to the center of the latter. Connected to the lower extremities of the legs 7 is a yoke 9 having two sets of up-turned ears 10 which are connected by bolts 11 or their equivalents to the legs 7. Centrally the yoke is provided with a pair of downwardly-extending lugs 12 which receive between them the knee 13 of a sled runner 14, the knee 13 being connected to and held between the lugs 12 by means of a pivot 15 thus permitting the runner to rock in relation to the yoke.

Extending rearwardly from the clamp 4 is a driving frame which, in the preferred embodiment thereof, comprises a pair of side bars or members 16 arranged in spaced relation to each other and connected by pivots 17 to lugs 18 on the clamp 4. Between their ends, the frame members or arms 16 are connected by one or more braces 19. Journaled in the rear extremities of the brace 16 is a rotary shaft 20 having fast thereon a toothed or transversely ribbed traction or driving wheel 21 which operates between the extremities of the members 16. Fast on the same shaft 20 with the wheel 21 is a sprocket wheel 22 from which a drive chain 23 extends forwardly around a larger sprocket wheel 24 which is fastened on the adjacent end of the driving axle, taking the place of the adjacent driving wheel of the automobile.

The means for depressing the driving frame and traction wheel above referred to, comprises a lever 25 which is connected by a pivot 26 to lugs 27 on the clamp 4. Connected by a pivot 28 to the upper end of said lever is a rod 29 the other end of which is slidably inserted through a hole in a combined guide and spring seat 30. A coiled expansion spring 31 bears at one end against the guide 30 and at its opposite extremity against a tensioning nut 31' which is threaded on the rod for the purpose of increasing or diminishing the tension of said spring thereby causing the latter to act with greater or less depressing force on the driving frame and traction wheel. A contractile spring 32 is connected at one end to the lever 25 and at its opposite end to a lug 33 on the driving frame, the last named spring by being connected to the lower arm of the lever 25, serving to assist the expansion spring 31 in depressing the driving frame. A rod or other suitable connection 35 extends from the lower extremity of the lever 25 through a lug 36 extending downwardly from the clamp 4 and provided with an adjusting nut or device 37 whereby the last named rod may be adjusted for the purpose of either tensioning or relieving the driving frame-depressing spring to adapt the mechanism to be operated upon a snow-covered road surface or upon a surface which is not covered with snow, such as the floor of a garage.

39 designates an obliquely-disposed brace rod which extends to a collar 40 fastened to the rear axle housing adjacent to bolts 42. The block is shown as provided with two lugs 43 adapted to receive the rear extremities of two brace rods such as just above described, it being understood that two driving frames and traction wheels are used in connection with the rear axle housing and both of the traction wheels are driven by chains from the sprocket wheels on the opposite extremities of the rear driving axle.

Each of the front runners 44 is formed with an outwardly-extending inserted V-shaped knee 45 provided at a suitable elevation with a knuckle spindle box 46 adapted to fit over one of the spindles of the steering knuckles of the machine upon which it is secured by the usual nut, the same as one of the front wheels of an automobile. The front runners as well as the rear runners are thus adapted to rock in a fore and aft direction.

Each of the runners is provided with raising and lowering means the same consisting of a pair of wheels or rollers 47 each of which is journaled on the arm 48 of a sector gear 49 mounted on a journal 50 extending laterally from the runners. Located above the sector gears is a worm shaft 51 having two worms 52 which mesh with said sector gears, the worm shaft having one or both ends thereof squared to receive a suitable wrench. By turning said shaft in one direction, the rollers or wheels may be depressed below the bottoms of the runners in order to enable the vehicle to be propelled over a bare road surface and by turning said worm shafts in the opposite direction, said wheels are elevated to a position above the bottoms of the runners, enabling the latter to rest in full contact with the road surface.

In view of the foregoing description taken in connection with the accompanying drawings, it will now be seen that the pressure of the traction wheels on the road surface may be regulated to suit varying conditions and that whenever necessary the tension on the traction wheels may be relieved to such an extent that they will not be injured by a bare road surface nor will they injure said surface. Furthermore, the runners may be elevated out of contact with a bare road surface thus rendering the mechanism particularly desirable in that an automobile equipped with the sled attachment may be readily driven into and out of a garage and over other bare places in a road surface without injury to either the driving mechanism, the runners or the road surface.

What is claimed is:—

1. The combination with the axle housing of an automobile, of a longitudinally divided sleeve-like clamp adapted to be fastened thereon, downwardly-diverging legs on said clamp, a runner having an upwardly-extending knee, and a yoke connecting the clamp legs and the runner knee and having a pivotal connection with the knee of the runner, adapting the runner to rock in a fore and aft direction.

2. The combination with the rear axle housing of an automobile, of a support having a fixed relation to said housing, a runner attached to said support, a driving frame pivotally connected to said support and extending rearwardly therefrom, a traction wheel journaled in said driving frame and geared to and actuated by the driving axle of the vehicle, a lever pivotally mounted on said support, a rod extending rearwardly from an arm of said lever, a guide on the driving frame through which said rod is slidable, a frame depressing spring surrounding said rod, and means connecting said lever with said support, whereby the tension of said spring may be regulated.

3. The combination with the rear axle housing of an automobile, of a sleeve-like clamp surrounding the same and having a fixed relation thereto, a runner attached to said clamp, a driving frame pivotally connected to said clamp and extending rearwardly therefrom, a traction wheel journaled in the rear end of said driving frame and geared to and actuated by the driving axle of the machine, a lever pivotally mounted between its ends on said clamp, a rod extending rearwardly from the upper arm of said lever, a guide on the driving frame through which said rod is slidable, a frame-depressing spring surrounding said rod, a contractile spring connecting the lower arm of said lever with the driving frame, and means connecting the lower arm of said lever with said clamp, whereby the tension of said contractile spring may be regulated for the purpose described.

In testimony whereof I affix my signature.

ED. STANLEY.